(12) United States Patent
Iwanaga et al.

(10) Patent No.: US 6,798,470 B2
(45) Date of Patent: Sep. 28, 2004

(54) ELECTROPHORESIS DISPLAY

(75) Inventors: Hiroki Iwanaga, Kanagawa-ken (JP);
Hideyuki Nakao, Kanagawa-ken (JP);
Masayuki Oguchi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 110 days.

(21) Appl. No.: 10/101,915

(22) Filed: Mar. 21, 2002

(65) Prior Publication Data
US 2002/0135860 A1 Sep. 26, 2002

(30) Foreign Application Priority Data
Mar. 21, 2001 (JP) ..................... P2001-081595

(51) Int. Cl.⁷ ................. G02F 1/1333; C09K 19/60
(52) U.S. Cl. ................. 349/86; 349/89; 349/165
(58) Field of Search ................. 349/86–90, 165, 349/106, 89; 359/296

(56) References Cited

U.S. PATENT DOCUMENTS 5,499,121 A * 3/1996 Brewer ................. 349/89
6,025,896 A * 2/2000 Hattori et al. ................. 349/56
6,392,786 B1 * 5/2002 Albert ................. 359/296
6,650,384 B2 * 11/2003 Oguchi et al. ................. 349/86
2002/0191142 A1 * 12/2002 Oguchi et al. ................. 349/165

FOREIGN PATENT DOCUMENTS

JP 2000-66247 3/2000

\* cited by examiner

Primary Examiner—Dung T. Nguyen
(74) Attorney, Agent, or Firm—Oblon, Spivak, McClelland, Maier & Neustadt, P.C.

(57) ABSTRACT

An electrophoresis display capable of displaying colors, yet having high contrast and a high reflectance on displaying white color. The electrophoresis display device includes a dispersion medium containing a liquid crystal and electrophoretic particles made of titania, etc. being dispersed in the dispersion medium, wherein the dispersion medium contains a dichroic coloring matter having dichroism with a high dichroic ratio as a first coloring matter and a dichroic coloring matter having dichroism with a low dichroic ratio and/or an isotropic coloring matter as a second coloring matter, provided that the first coloring matter and the second coloring matter have complementary colors each other. In this manner, white, black, and color displays are realized by a single capsule.

29 Claims, 19 Drawing Sheets

(a)

(b)

(c)

(d)

(e)

|   | (1) | (2) | (3) |
|---|-----|-----|-----|
| A | Black | White | Red |
| B | Black | White | Green |
| C | Black | White | Blue |

PRIOR ART

PRIOR ART

PRIOR ART

PRIOR ART

PRIOR ART

ELECTROPHORESIS DISPLAY

CROSS-REFERENCE TO RELATED APPLICATIONS

This application is based upon and claims the benefit of priority from the prior Japanese Patent Applications No. P2001-81595, filed on Mar. 21, 2001; the entire contents of which are incorporated herein by reference.

BACKGROUND OF THE INVENTION

1. Field of the Invention

The present invention relates to an electrophoresis display.

The invention is based on the guest-host effect which is realized by the switching of a dichroic coloring matter dissolved in a liquid crystal on applying voltage, and on the electrophoresis phenomenon of electrophoretic fine particles dispersed in a dispersion medium.

2. Discussion of the Background

The electric field inductive pigments of electrophorectic type used in the electrophoresis display at present are roughly classified in two types.

One of them is the type 1 shown in FIG. 7A. This type of pigment comprises microcapsules which enclose a coloring solvent 12. The coloring solvent 12 contains charged fine titania particles 11 dispersed therein. By using the electric field inductive pigment of this type, two colors, i.e., the white color of the fine titania particles 11 and the color of the solvent, can be displayed.

The other type of the electric field inductive pigment is the type 2 shown in FIG. 7B. This type contains a transparent solvent 22 enclosed in the microcapsules. Two types of charged fine particles 21a and 21b differing in charge sign and in color are dispersed in the transparent solvent 22. For instance, white colored positive charged fine particles 21a and black colored negative charged fine particles 21b are used. When negative voltage is applied to the upper side of the drawing, the white colored charged fine particles 21a concentrate to the upper side as shown in FIG. 7B. On the other hand, when a positive voltage is applied to the upper side, the black colored charged fine particles 21b concentrate to the upper side. That is, the type of fine particles appearing on the surface can be selected by controlling the direction of the electric field applied to the microcapsule, and the dichroic display is thereby realized.

The following literatures describe the above.

[1] B. Comiskey, J. D. Albert and J. Jacobson, Digest of SID97, p75.

[2] P. Drzaic, B. Comiskey, J. D. Albert, L. Zhang, A. Loxley and R. Feeney, Digest of SID99, p1131.

[3] Barrett Comiskey, J. D. Albert, Hidekazu Yoshizawa and Joseph Jacobson, Nature, 394, p253 (1998).

Although a display using the electric field inductive pigment above is advantageous in that they yield high contrast, it suffers a problem that there is difficulty in providing color display.

More specifically, in case of an electric field inductive pigment of type 1, the display is provided in two types, i.e., a white display using the scattering of fine titania particles 11 and a color display using the color of the dispersion medium 12. Hence, a color filter is necessary to realize a color display. In case of an electric field inductive pigment of type 2, the display is limited to two colors depending on the fine electrophoretic particles 21a and 21b. Hence, a color filter is indispensable in this case again.

FIG. 8 shows the method for realizing a color display by applying a color filter together with the electric field inductive pigment. In this case, the microcapsules, which contain a black colored solvent 12 having the white colored charged fine particles 11 dispersed therein, are densely arranged on the substrate. Red, green, and blue color filters are provided aligned to the position of each of the microcapsules. In case of realizing a red display, for instance, the green and the blue pixels are set in the light absorbing state (black display), while the red pixels alone are set in the light reflecting state. The intensity of the reflection light is reduced to about one third due to the absorption of the color filter 13, and, the resulting intensity is further reduced to about one third because the green and blue pixels turn to the light absorption state. Hence, the resulting optical efficiency becomes as low as about $1/9$ ($1/3 \times 1/3 = 1/9$).

Further, in case of realizing a white color display, the red, green, and blue pixels all turn to a light reflecting state, but due to the optical absorption of the color filter, the resulting display is reduced to about $1/3$ of the incident light intensity despite the reflectance is at the maximum.

Accordingly, it is presumed that only a dark display is realized by the color filter type. Since an increase in optical transmittance of the color filter is in trade off with the improvement in color purity of the display color, the range of color reproduction decreases in an attempt to improve the transmittance of the color display by increasing the optical efficiency.

On the other hand, there is proposed a method of coloring the fine particles themselves in the three color primaries. More specifically, as shown in FIG. 9, this method comprises coloring the electrophoretic fine particles 31, and pattern printing the color region.

In accordance with the method, a white display is realized by additive color mixture of red, green, blue colors, but it is a dark display with an optical efficiency of about $1/3$.

Furthermore, as shown in FIG. 10, there is a method of realizing color display by using a colored solvent. This method comprises coloring the dispersion medium of the white colored electrophoretic fine particles 11 into red 41, green 42, and blue 43 colors. For instance, in case of red display, the red microcapsules are set to the light absorbing state, while the green and blue microcapsules are set to the light reflecting state. Although a bright color display can be obtained in this case, the display results in an unclear pale color display. A high reflectivity is obtained in white display, and, in the black display, an additive color mixture state of red, green, and blue is realized with high reflectivity and low contrast.

As shown in FIG. 11, there is a method of realizing a color display by using the fine particles 31 colored in three primaries and the color solvents 41, 42, and 43. That is, this method comprises coloring both of the electrophoretic fine particles and the solvents. In this case, the colors of the solvents and the electrophoretic fine particles are set in the complementary relation with each other to obtain the black display and the colored display with a single capsule. Referring to FIG. 11, three types of microcapsules, i.e., the microcapsules containing red color fine particles with a cyan colored solvent 41, the microcapsules containing green color fine particles with a magenta colored solvent 42, and the microcapsules containing blue fine particles with a yellow colored solvent 43, are densely arranged on the substrate. In a microcapsule containing red color fine particles with a cyan colored solvent 41, as shown in FIG. 11, red color is displayed in case the red fine particles are present in the upper side. On the contrary, when the red fine particles are disposed on the lower side, the color of the fine particles is mixed with the color of the solvent to display a black color. In a microcapsule containing green color fine particles with a magenta colored solvent 42, green color and black color are displayed in case the particles are disposed on the upper side and the lower side, respectively. Further, in a microcapsule containing blue color fine particles with a yellow colored solvent 43, blue color and black color are displayed in case the particles are disposed on the upper side and the lower side, respectively.

For instance, in case of red color display, as shown in FIG. 11, the pixel on the left edge yields a red display, and the other two types of pixels yield a black display. The optical efficiency in this method is about $1/9$ to result in a dark color display.

In case of white display, red, green, and blue displays are realized with three types of capsules to implement white color with the additive color mixture thereof. However, the optical efficiency is about $1/3$ to result in a dark display.

In this method again, there still remains a problem that the reflectance of the white display is decreased and that the reflectance of black display is increased, as to result in a low contrast.

On the other hand, concerning the relation of complementary colors, in case the colors of the colored fine particles and the solvent are exchanged with each other, the optical efficiency in white display increases to about $2/3$ to result in a bright display. However, there occurs a problem that the range of color reproduction is greatly limited in the color display due to the planar arrangement of YMC.

In addition to above, there is a method of realizing color display by dispersing two types of electrophoretic fine particles differing in the sign of charges in a transparent solvent. This method can be furthermore classified into a case using a color filter and a case using colored particles.

Firstly, the method using a color filter is explained below by making reference to FIG. 12.

In case of red display, the microcapsules reflect only $1/3$ of the incident light, and the color filter 13 absorbs about $1/3$ thereof; hence, in total, the optical efficiency in displaying red color results as low as about $1/9$, i.e., a dark display is realized. In the case of white display, although all the pixels are in the light reflecting state, the optical efficiency remains low at about $1/3$.

Then, the method comprising dispersing two types of electrophoretic fine particles with different charge signs in a transparent solvent 22 is described below with reference to FIG. 13. For instance, a pattern is formed by using three types of capsules; i.e., capsules containing black and red fine particles 51, capsules containing black and green fine particles 52, and capsules containing black and blue fine particles 53.

Referring to FIG. 13, the capsule in the left end contains red fine particles and the black fine particles on the upper side and the lower side, respectively. In the other capsules, the black fine particles are disposed on the upper side, while the green fine particles and the blue fine particles are present on the lower side. In this case, red color is displayed.

In the case of red display, the other two types of capsules yield black displays, and the optical efficiency in displaying color is about $1/9$. White display is realized by the additive color mixture of the reflection lights of red, green, and blue, thereby resulting in a dark display with an optical efficiency of about $1/3$.

Furthermore, there is another method comprising densely arranging three types of capsules on the substrate while changing the color of the fine particles, i.e., by using capsules containing white and red fine particles 61, capsules containing white and green fine particles 62, and capsules containing white and blue fine particles 63. This case is shown in FIG. 14.

In case of displaying red color with the constitution above, the red fine particles 61 in the left end capsule are concentrated to the upper side, while the white fine particles are disposed to the lower side. The other two capsules are set to display white. Thus, this case results in a pale display with low color purity. A bright display can be realized in the white display because all of the pixels are in the light reflecting state; however, in the black display, the contrast becomes low because it is realized by the subtractive color mixture of the reflecting light of red, green, and blue.

As described above, there are two types of microcapsule type electrophoretic E-ink; a display type comprising switching the color of the electrophoretic fine particles and the solvent, and a display type comprising color switching of the two types of electrophoretic fine particles. However, by principle, the color display is implemented at the great expense of either the contrast or the reflectance. Thus, a display that is both bright and clear cannot be obtained.

As described above, in order to realize a color display while maintaining high contrast, it is necessary to display white color, black color, and the other three color primaries by a single microcapsule. However, an electrophoretic E-ink capable of realizing such a display is not obtained heretofore.

Furthermore, the electrophoresis method above has no distinct threshold voltage, and the problem thereof is that gradation cannot be realized with a single color display unit. That is, in the method above, since few display colors are possible, the display results unclear.

SUMMARY OF THE INVENTION

An aspect of the present invention provides an electrophoresis display comprising: a substrate; a first electrode formed on said substrate; capsules provided on said first electrode, and said capsules including a first coloring matter having dichroism, a second coloring matter, and charged particles in a dispersion medium; a second electrode formed on said capsules, wherein said second coloring matter has a smaller dichroism ratio than that of said first coloring matter.

An aspect of the present invention provides an electrophoresis display comprising: a substrate; a first electrode formed on said substrate; a first color capsule provided on said electrode, and including a cyan coloring matter having dichroism and a red coloring matter in a dispersion medium; a second color capsule provided on said electrode, and including a magenta coloring matter having dichroism and a green coloring matter in a dispersion medium; a third color capsule provided on said electrode, and including a yellow coloring matter having dichroism and a blue coloring matter in a dispersion medium; a second electrode formed on said first color capsules, said second color capsules, and said third color capsules, wherein said cyan coloring matter has a smaller dichroism ratio than that of said red coloring matter, said magenta coloring matter has a smaller dichroism ratio than that of said green coloring matter, and said yellow coloring matter has a smaller dichroism ratio than that of said blue coloring matter.

An aspect of the present invention provides an electrophoresis display comprising: means for coloring by a capsule, each of said capsule having three expressible colors; means for impressing a voltage to a capsule.

DETAILED DESCRIPTION OF THE INVENTION

Microcapsules containing encapsulated therein a liquid crystal having dispersed therein the fine particles are used in an embodiment according to the invention. The liquid crystal contains a dichroic coloring matter having a high dichroic ratio and a dichroic coloring matter having a low dichroic ratio. Otherwise, it may contain a dichroic coloring matter having a high dichroic ratio and an isotropic coloring matter. By using the microcapsules above, a clear color display is realized. In the invention, this is denoted as a guest-host electrophoresis method.

The embodiment of the invention is described below by making reference to the drawings.

Figure 1:
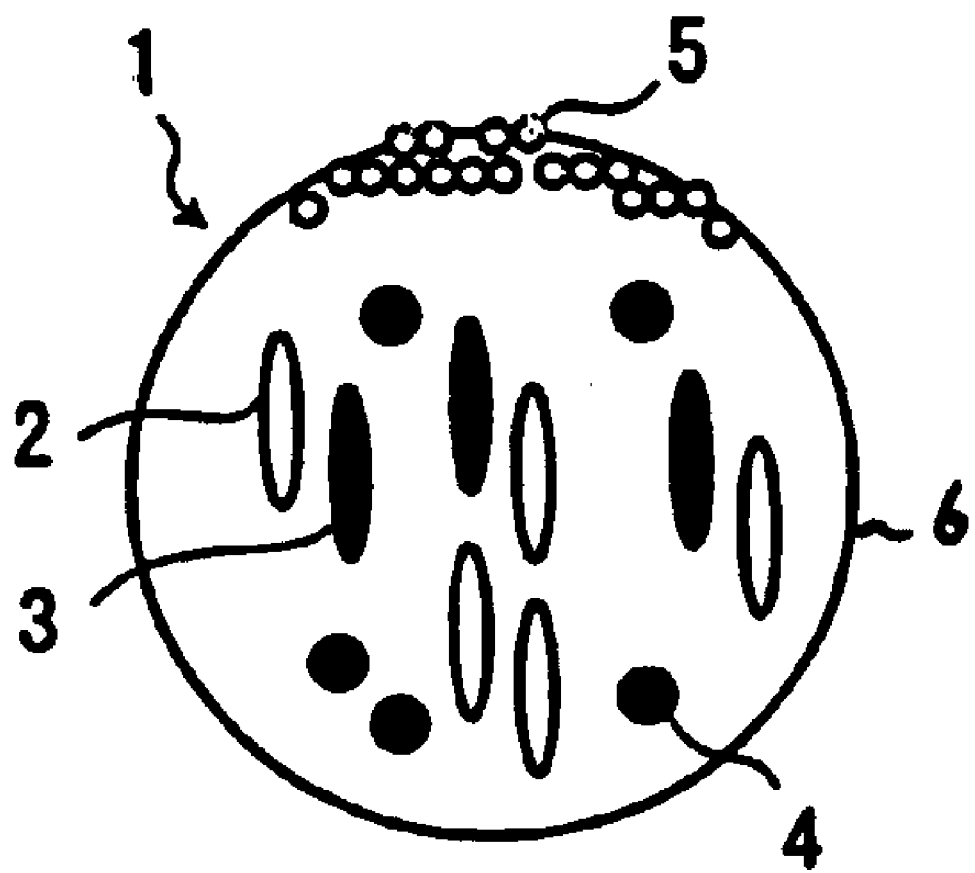
FIG. 1 is a schematic drawing showing the guest-host electrophoresis method according to an embodiment of the invention.

FIG. 1 is a schematic drawing showing the electrophoresis device according to one aspect of the invention.

Referring to FIG. 1, a capsule 1 for use in the guest-host electrophoresis method contains a dispersion medium enclosed inside a coating 6. The dispersion medium contains dispersed therein liquid crystal molecules 2, a first coloring matter 3 having a high dichroic ratio, a second coloring matter 4 having a low dichroic ratio, and electrophoretic fine particles 5. The first coloring matter herein is, for instance, a dichroic coloring matter. The second coloring matter is a dichroic coloring matter having a low dichroic ratio or an isotropic coloring matter.

In case an ordinary solvent is used as the dispersion medium inside the capsule 1, it is necessary to use a solvent having a high specific gravity in order to prevent the electrophoretic fine particles 5 from causing coagulation or settling. Thus, one may think of using a chlorine based solvent such as tetrachloroethylene. However, this solvent suffers difficulties in its handling because it has a great influence on the environment and undergoes volatilization.

Thus, preferred as the solvent is such containing liquid crystal molecules. In this case, a liquid crystal solvent is advantageous in that it is favorable from the viewpoint of environmental concerns and that it does not volatilize. Furthermore, because it has high viscosity, the coagulation and the settlement of fine particles can be prevented from occurring. Moreover, since the liquid crystal molecules align at the electrophoresis of the fine particles, the mobility of the fine particles can be increased along the direction of the alignment. That is, a liquid crystal solvent is preferred because it not only greatly contributes in improving the dispersibility of the fine particles, but also contributes to the movement thereof.

As the liquid crystal material for use in the dispersion medium, there can be mentioned, for instance, a fluorine based liquid crystal, a cyano based liquid crystal and an ester based liquid crystal.

Also usable is a liquid crystal material having a positive dielectric anisotropy. However, a known liquid crystal having a negative dielectric anisotropy may be used in mixture with a liquid crystal having a positive dielectric anisotropy, so long as the mixed liquid crystals as a whole exhibit a positive dielectric anisotropy.

Moreover, it is possible to use a liquid crystal having a negative dielectric anisotropy by utilizing a proper device constitution and drive method. In this case, the direction of the liquid crystal molecules and the dichroic coloring matter molecules, on applying a voltage, is the reverse of that of no applied voltage of FIG. 1. In case a p-type dichroic coloring matter is used, the display color is the same as that using a liquid crystal having a positive dielectric anisotropy. In case an n-type dichroic coloring matter is used, the "color of the isotropic coloring matter" and "black" are reversed.

The first and the second coloring matters for use in the invention are preferably anthraquinone coloring matters having excellent fastness. If the fastness of the coloring matter is low, chemical reaction takes place at the interface of the fine titania particles so as to cause a change in molecule structure and lose the function.

The content of the first and the second coloring matters in total is preferably 0.01 wt. % or higher but not higher than 10 wt. %, and preferably, 0.1 wt. % or higher but not higher than 5 wt. %, with respect to the weight of the liquid crystal material. If the content of the coloring matter should be too low, difficulty is found in sufficiently increasing the contrast. If the content of the coloring matter should be too high, the color of resulting liquid crystal becomes too dense so as to cause degradation in reflectance on realizing white display. That is, the contrast is impaired.

Preferably, the difference in dichroic ratio for the first and the second coloring matters is large. Higher contrast can be realized with increasing difference. The difference in dichroic ratio between the coloring matters is preferably 8 or larger.

Furthermore, the second coloring matter preferably contains fine pigment particles 0.2 $\mu$m or less in mean particle diameter. In case particles of larger than 0.2 $\mu$m in mean particle diameter are used, color purity decreases due to the scattering of visible light.

The electrophoretic fine particles are not only limited to those of titania, but also usable are those of, for example, silica and alumina. Fine polymer particles or metal-coated polymer particles are also applicable.

From the viewpoint of the moving rate and contrast, the particle diameter of the charged particles is preferably as small as possible. That is, in case the mean particle diameter of the fine particles exceeds 0.2 $\mu$m, the mobility rate becomes small as to result in a low response rate. Furthermore, the colored dispersion medium tends to intrude into the interstices of the fine particles on white display as to induce a drop in reflectance. Moreover, the larger fine particles tend to cause disordering of the arrangement of liquid crystal. From those points of view, the charged particles are preferably as small as possible.

On the other hand, coagulation force increases with decreasing particle diameter of the fine particles so as to lead to the problem of settlement. There is a method comprising covering the surface of the fine particles with a polymer and the like to prevent settlement from occurring. Accordingly, it is preferred to use fine charged particles decreased in particle diameter to the limit while taking possible techniques to prevent the coagulation and settlement from occurring.

As the method for preparing microcapsules, there can be mentioned known micro encapsulation methods conventionally employed in the art, such as membrane emulsification, phase separation, submerged drying, interfacial polymerization, in situ polymerization, submerged hardened coating, and spray drying.

As the material for use as the coating of the microcapsules, there can be mentioned almost all of the polymer materials, for instance, an ethylene copolymer such as polyethylene, chlorinated polyethylene, ethylene-vinyl acetate copolymer, ethylene acrylic acid, and maleic anhydride copolymer; a polyester such as polybutadiene, polyethylene terephthalate, polybutyrene terephthalate, and polyethylene naphthalate; polypropylene; polyisobutyrene; polyvinyl chloride; natural rubber; polyvinylidene chloride; polyvinyl acetate; polyvinyl alcohol; polyvinyl acetal; polyvinyl butyral; an ethylene tetrafluoride resin; an ethylene trifluoride resin; ethylene fluoride-propylene resin, vinylidene fluoride resin, vinyl fluoride resin, inclusive of tetrafluoroethylene copolymer such as tetrafluoroethylene perfluoroalkoxy ethylene copolymer, tetrafluoroethylene perfluoroalkyl vinyl ether copolymer, tetrafluoroethylene propylene hexafluoride copolymer, and tetrafluoroethylene ethylene copolymer, and a fluorine-containing polybenzoxazole resin; acrylic resin; methacrylic resin; fumaric acid resin; maleic acid resin; polyacrylonitrile; an acrylonitrile copolymer such as acrylonitrile butadiene styrene copolymer; a polyamide such as polystyrene, styrene acrylonitrile copolymer, acetal resin, and Nylon 66; polycarbonate; polyester carbonate; cellulose resin, phenolic resin; urea resin; epoxy resin; unsaturated polyester resin; alkyd resin; melamine resin; polyurethane; diaryl phthalate; polyphenylene oxide; polyphenylene sulfide; polysulfone; polyphenylsulfone; silicone resin; polyimide; bismaleimide triazine resin; polyimidoamide resin; polyether imide; polyvinyl carbazol; a norbornene based amorphous polyolefin; and cellulose.

In the capsule 1 above, the three states, i.e., a white display, a black display, and a color display, are described below, with reference to FIG. 2, for a case using white colored titania as the electrophoretic fine particle 5.

(1) Black Display

Referring to FIG. 2A, the first coloring element 3 is arranged horizontally inside the capsule 1 in case no electric field is applied. The second coloring matter 4 is less affected by the electric field. The fine titania particles 5 inside the dispersion medium is in a dispersed state inside the capsule. On observing the capsule 1 from the upper side, a mixed color of the first coloring matter 3 and the second coloring matter 4 can be perceived. Since the fine particles 5 are dispersed in the dispersion medium, only the mixed color of the first coloring matter 3 and the second coloring matter 4 is observed. By properly selecting the first coloring matter 3 and the second coloring matter 4, black color can be set in the mixed color state. Black display can thus be implemented.

Otherwise, as shown in FIG. 2B, fine titania particles 5 can be accumulated to the lower side for a predetermined duration of time by first applying a direct current voltage to accumulate the fine titania particles 5 on the lower part, and by then setting a state with no voltage applied. Under a state of no applied voltage, the first coloring matter 3 are arranged horizontally, and by the subtractive color mixing of the first coloring matter 3 and the second coloring matter 4, black display is realized. In this case, light diffusion ascribed to fine particles 5 is suppressed because the fine particles 5 are not dispersed. In this manner, a clearer black display can be implemented.

(2) White Display

Referring to FIG. 2C, the fine titania particles 5 are accumulated to the upper part of the microcapsule by applying direct current voltage to the capsule 1. In this case, white color is realized by the reflection from the fine titania particles 5.

Ideally, the dispersion medium is covered by the fine particles 5 to display pure white color. In practice, however, the dispersion medium is slightly perceived from the interstices of the fine particles 5. However, since the first coloring matter 3 of the capsule 1 is arranged along the direction of the electric field as to realize a color extinction state, slightly observed is the color of the second coloring matter 4 alone. Accordingly, white color close to pure coloring can be realized.

Figure 7:
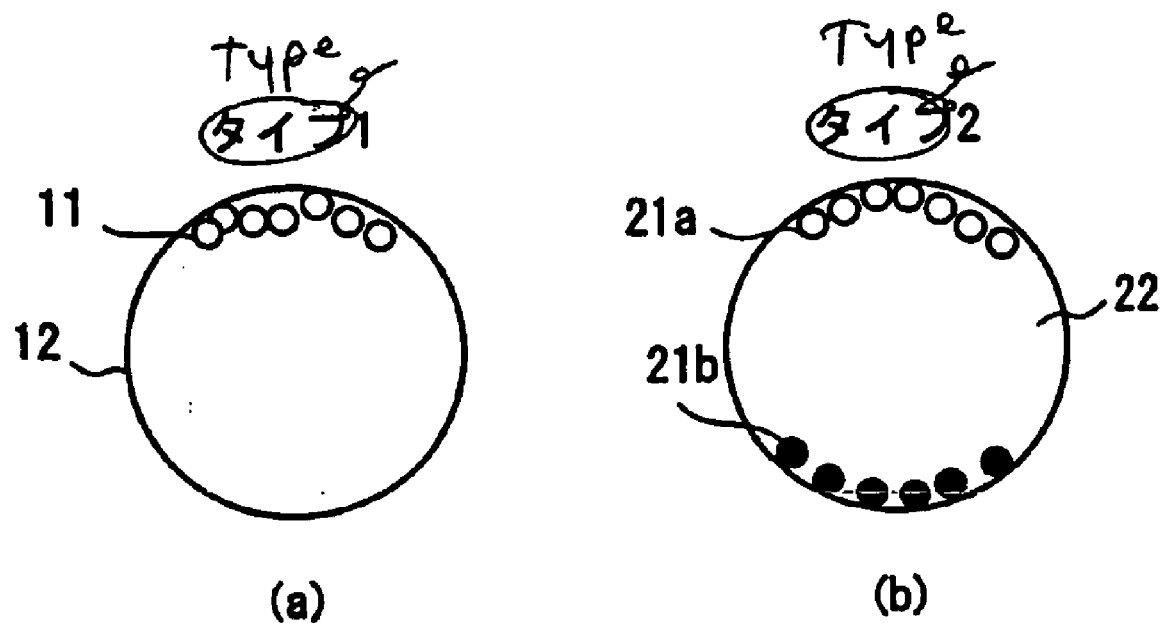
FIGS. 7A and 7B are a diagram schematically showing an electrophoretic E-ink of a related art.
Figure 8:
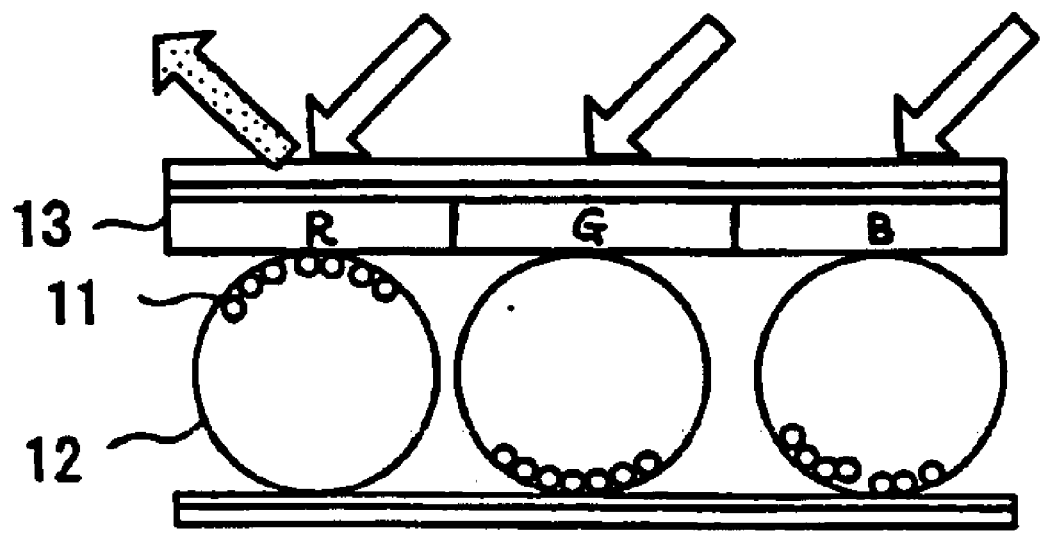
FIG. 8 is an explanatory diagram showing a display state of an electrophoretic E-ink of a related art.
Figure 9:
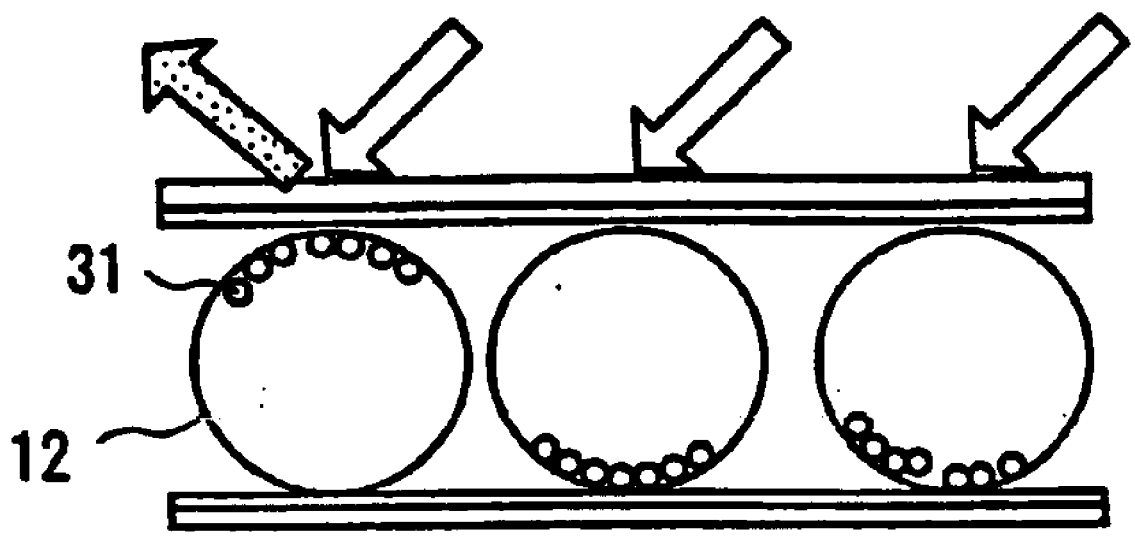
FIG. 9 is an explanatory diagram showing a display state of another electrophoretic E-ink of a related art.
Figure 10:
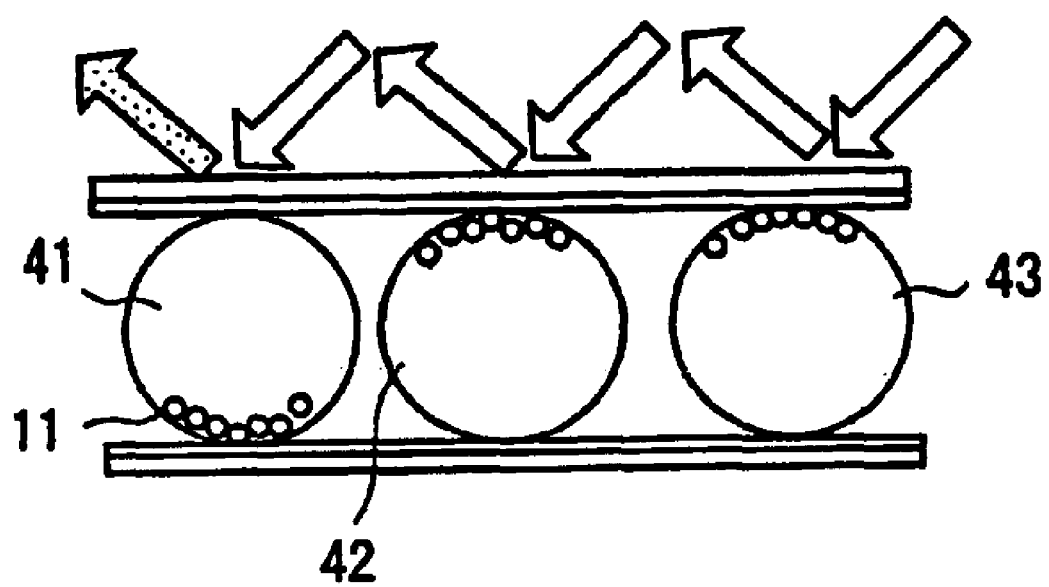
FIG. 10 is an explanatory diagram showing a display state of still other electrophoretic E-ink of a related art.
Figure 11:
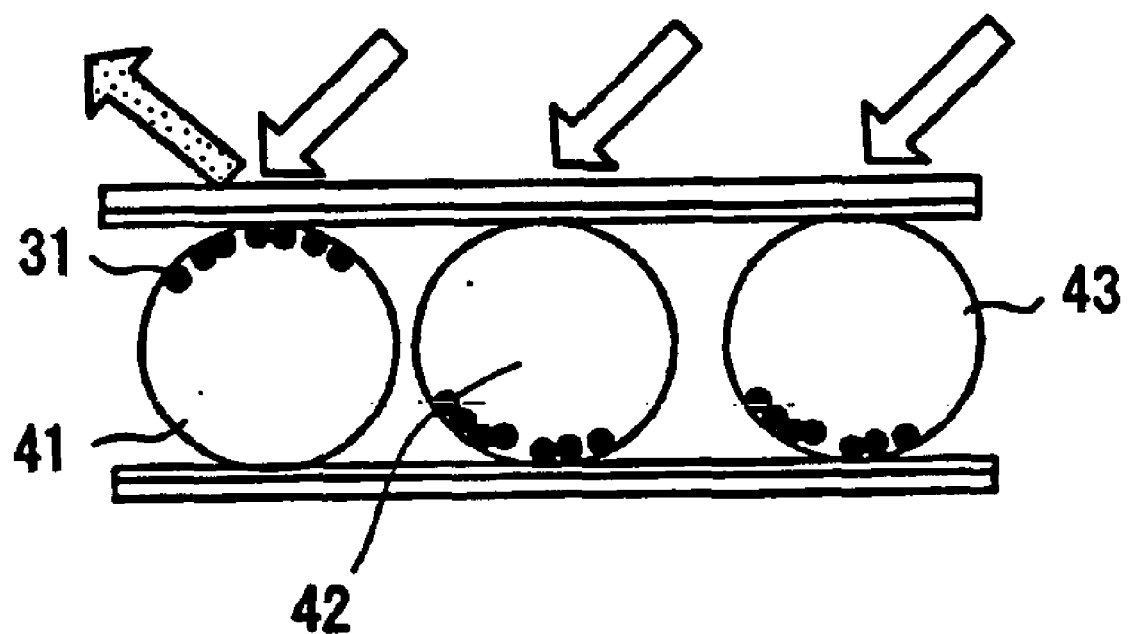
FIG. 11 is an explanatory diagram showing a display state of a yet other electrophoretic E-ink of a related art.
Figure 12:
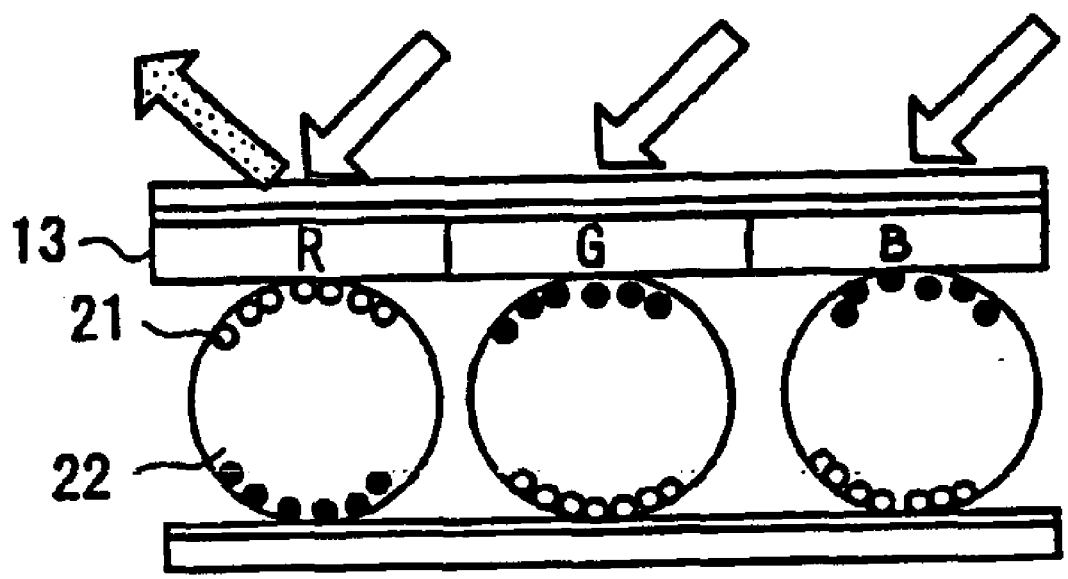
FIG. 12 is an explanatory diagram showing a display state of an other electrophoretic E-ink of a related art.
Figure 13:
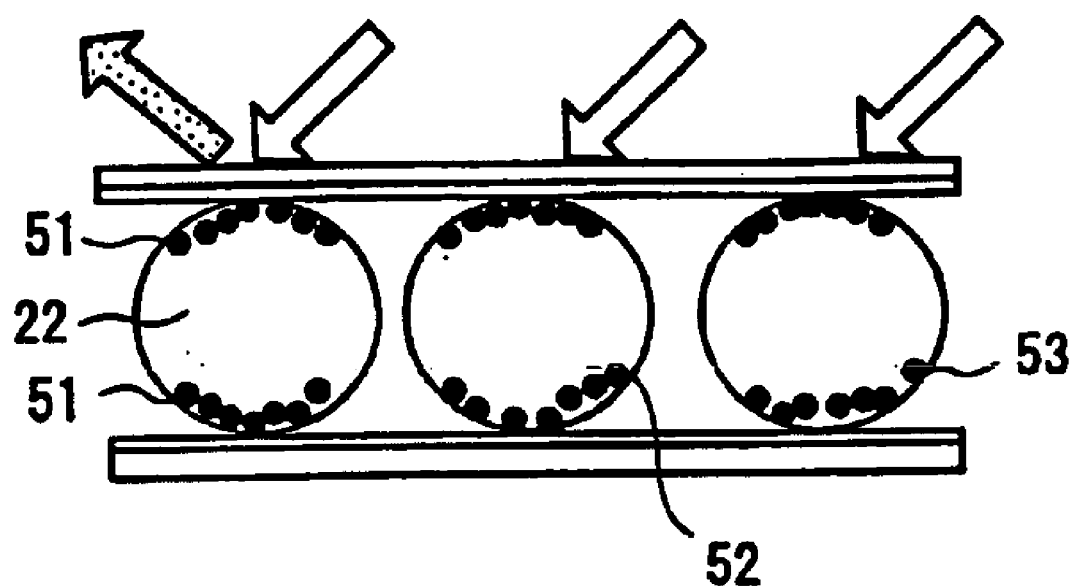
FIG. 13 is an explanatory diagram showing a display state of another electrophoretic E-ink of a related art.
Figure 14:
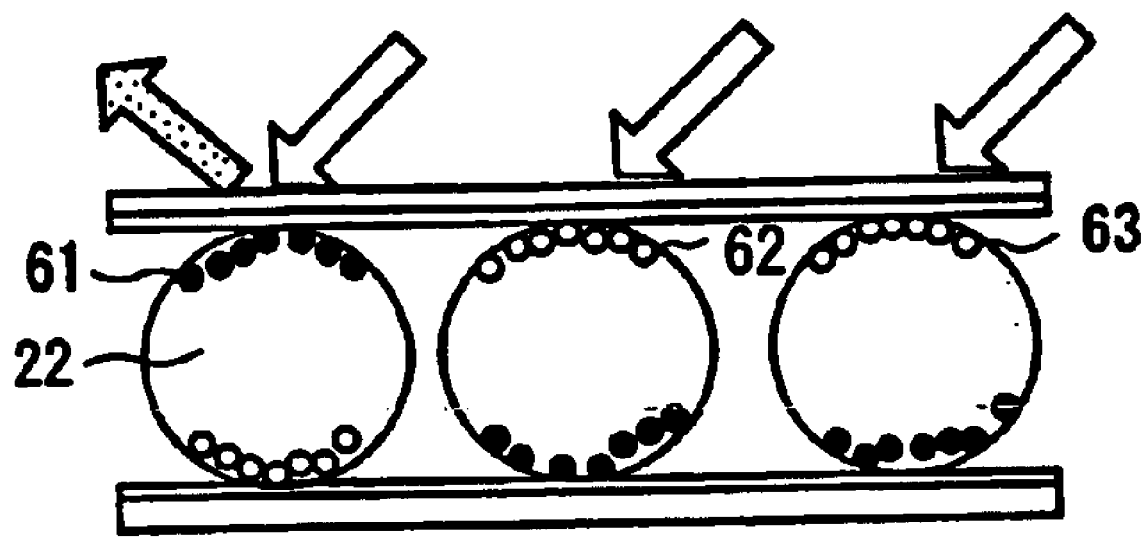
FIG. 14 is an explanatory diagram showing a display state of another electrophoretic E-ink of a related art.

On the other hand, in an E-ink heretofore used as shown in FIG. 7A, the color of the dispersion medium slightly perceived negatively affects the appearance because a dense colored dispersion medium is used originally to cut off light. Hence, the reflectance of white color is lowered. Comparatively, white display in the case of the present embodiment is higher in reflectance than that shown in FIG. 7A.

(3) Display of Second Coloring Matter

Referring to FIG. 2D, an alternating current voltage is applied to the capsule 1 at a frequency not lower than a predetermined value. Under an alternating current electric field with a certain frequency or higher, the fine titania particles 5 vibrate at their sites with their position almost unchanged. Thus, the state is maintained with the fine particles 5 being dispersed in the dispersion medium 2. On the other hand, the first coloring matter 3 is arranged along the direction of the electric field to realize a color extinction state when observed from the upper side. In this manner, a color display with the second coloring matter 4 is realized. So, the state in which the fine particles 5 are dispersed can be realized under no electric field applied.

Referring to FIG. 2E, it is possible to apply an alternating current voltage over a predetermined value after first applying a direct current voltage in a direction reverse that of the white display of (2) to accumulate the fine titania particles 5 on the lower part. By doing so, the first coloring matter 3 is arranged along the direction of the electric field so as to realize the color display with second coloring matter 4 while the fine particles 5 remain accumulated on the lower part. In this case, the light diffusion attributed to the fine particles 5 is suppressed in case it is observed from the observer side. Thus, a clearer color display can be achieved.

The direction of the dichroic coloring matter is changed in accordance with the voltage irrespective of whether an alternating current or a direct current is applied. That is, the direction of the coloring matter can be changed by applying or by not applying an electric field.

However, the electrophoretic fine particles are influenced by the frequency of the voltage applied to the capsule. More specifically, the electrophoretic fine particles do not respond to an alternating voltage exceeding a certain range, but vibrate without changing their position. On the other hand, the position thereof is changed in case a low frequency is applied in a certain range.

In a display device of the constitution above, three states, i.e., white, black, and color display states, can be realized in a single capsule. That is, color display can be realized while maintaining the high reflectance and high contrast of the electrophoresis method.

In (1) to (3) above, description is provided for the case of switching black, white, and color displays of the second coloring matter by utilizing the combination of direct voltage and alternating voltage. In addition to above, it is possible to switch colors by using a plurality of alternating voltages differing in frequency. More specifically, the liquid crystal molecules respond to both of the direct voltage and the alternating voltage, while the fine titania particles change their positions only in correspondence to the voltage of a certain value or lower depending on the size and the shape of the particles. Accordingly, the direct voltage can be replaced by an alternating voltage of a certain value or lower.

Figure 15:
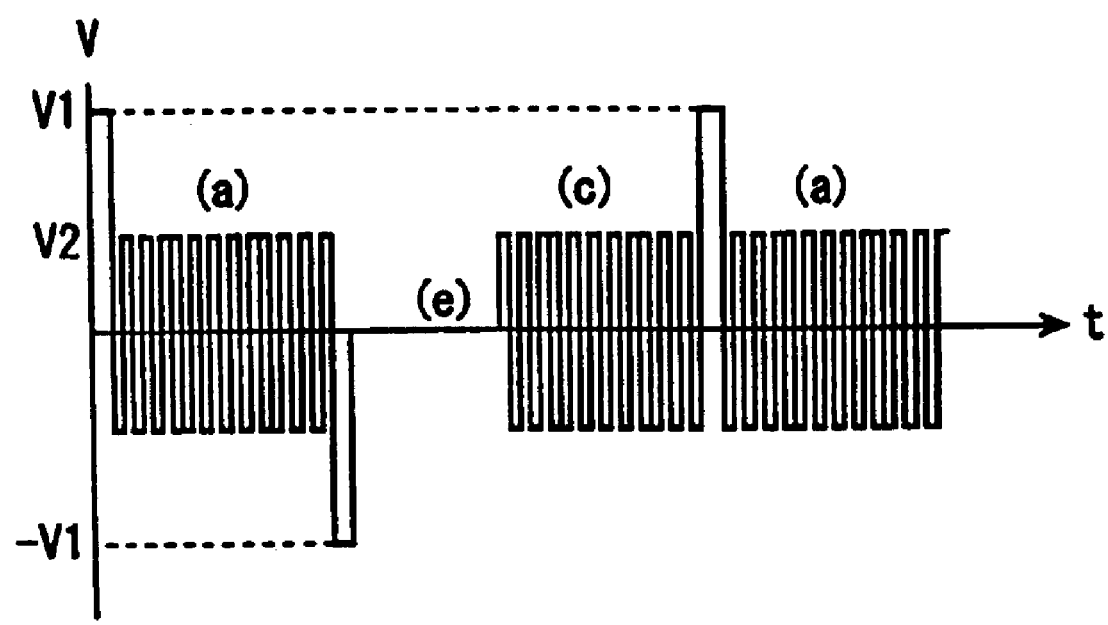
FIG. 15 is a diagram showing switching among white, black, and color displays in a guest-host electrophoresis method according to an embodiment of the invention.

More specifically, for instance, the display color can be switched in a manner shown in FIG. 15.

A case of switching the colors in the following sequence of white, black, color, white, . . . is described below.

First, the fine particles are accumulated to the upper part by applying a voltage V1. An alternating voltage V2 is applied thereafter at a frequency not lower than a certain value, such that the position of the fine particles is not affected thereby. In this manner, a white display (FIG. 15A) is realized. Then, black state is realized by accumulating the fine particles to the lower part by applying V1 in the reversed direction, and by then cutting off the applied voltage (FIG. 15E). On applying alternating voltage V2 in this state (FIG. 15C), a color state exhibiting the color of the second color matter is achieved. By further applying a voltage V1 to accumulate the fine particles to the upper state and by applying V2 (FIG. 15A) thereafter, the state of white display can be recovered.

Figure 3:
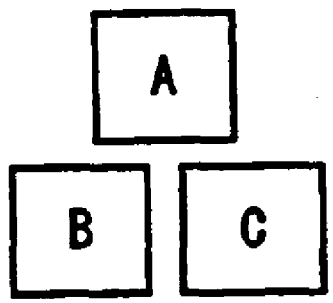
FIG. 3 is an explanatory diagram showing a display using the guest-host electrophoresis method according to an embodiment of the invention.

In the guest-host electrophoresis method according to the embodiment of the invention, for instance, three types of capsules can be formed as such that they realize a white-red-black color display, a white-green-black color display, and a white-blue-black color display. By aligning the three types of capsules in a so-called Δ arrangement, a display like a paper as shown in FIG. 3 can be implemented. In this case, the capsules can be aligned on the substrate by printing.

An electrode is provided beforehand to the substrate on which the capsules are aligned. A transparent electrode is provided to the other substrate to sandwich the capsules. The electrodes may both be transparent electrodes. Furthermore, the electrodes on the substrates may be formed in columns as such that the electrodes on one substrate may make right angles with the electrodes on the other substrate. In this manner, a desired voltage can be applied to a specific single capsule.

Referring to FIG. 3, the capsules differing in colors are shown by A, B, and C. In the table of FIG. 3, the left column (1) shows a black color display, the right column (2) shows a white color display, and the center column (3) shows a color display with the color of the second coloring matter.

The display device above can realize gradation in a manner similar to an ordinary guest-host liquid crystal display device.

It is also possible to implement gradation display as follows.

Figure 16:
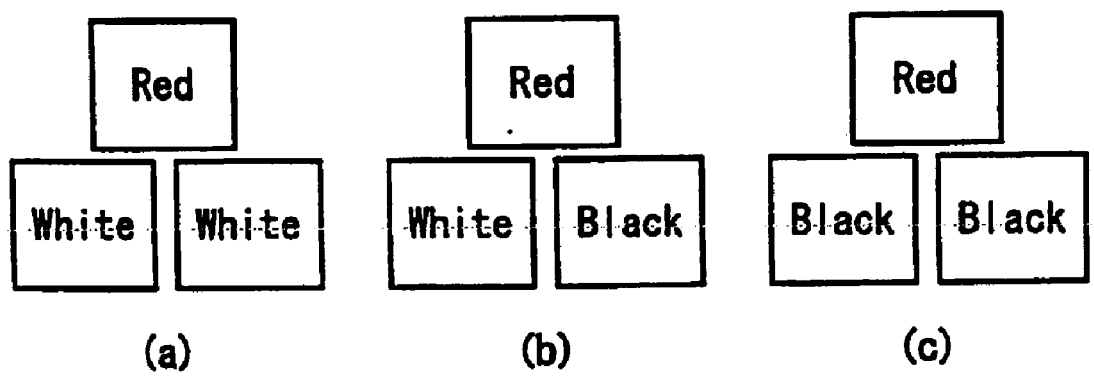
FIGS. 16A to 16C are a diagram showing three different types of red displays differing in brightness and color purity in a guest-host electrophoresis method according to an embodiment of the invention.

FIG. 16 depicts a red display depending on three types of luminance. More specifically, referring to FIG. 16A, bright red can be expressed by displaying red with one capsule while displaying white with the two other capsules. As shown in FIG. 16B, an intermediate red color display can be realized by displaying red with one capsule, while displaying white and black with each of the other two capsules. Furthermore, as shown in FIG. 16C, dark red can be displayed by setting one capsule to red display while setting black display to the other two capsules.

Furthermore, fine gradation over a wide range can be realized by combining the gradation above with the other host-guest effect gradation.

The capsules can be aligned by dispersing them in a proper binder resin for fixing. However, the amount of the binder resin is preferably not higher than 50 wt. % with respect to the amount of the liquid crystal, because the portion for display is reduced in case the binder resin is mixed at a higher ratio.

As usable binder resins, there can be mentioned thermoplastic resins such as polyethylene, chlorinated polyethylene; ethylene-vinyl acetate copolymer, an ethylene copolymer such as ethylene acrylic maleic anhydride copolymer; polybutadiene; a polyester such as polyethylene terephthalate, polybutyrene terephthalate, and polyethylene naphthalate; polypropylene; polyisobutyrene; polyvinyl chloride; polyvinylidene chloride; polyvinyl acetate; polyvinyl alcohol; polyvinyl acetal; polyvinyl butyral; an ethylene tetrafluoride resin; an ethylene trifluoride resin; an ethylene fluoride-propylene resin; a vinylidene fluoride resin; a vinyl fluoride resin; a tetrafluoroethylene copolymer such as tetrafluoroethylene perfluoroalkoxy ethylene copolymer, tetrafluoroethylene perfluoroalkyl vinyl ether copolymer, tetrafluoroethylene propylene hexafluoride copolymer, and tetrafluoroethylene ethylene copolymer; a fluororesin such as fluorine-containing polybenzoxazole resin; an acrylic resin; a methacrylic resin such as methyl polymethacrylate; polyacrylonitrile; an acrylonitrile copolymer such as acrylonitrile butadiene styrene copolymer; polystyrene; halogenated polystyrene; a styrene copolymer such as styrene methacrylic copolymer and styrene acrylonitrile copolymer; an ionic polymer such as sodium polystyrene sulfonate and sodium polyacrylate; an acetal resin; a polyamide such as Nylon 66; gelatin; gum arabic; polycarbonate; polyester carbonate; a cellulose resin; a phenolic resin; a urea resin; an epoxy resin; an unsaturated polyester resin; an alkyd resin; a melamine resin; polyurethane; a diaryl phthalate resin; polyphenylene oxide; polyphenylene sulfide; polysulfone; polyphenylsulfone; a silicone resin; polyimide; a bismaleimide triazine resin; polyimidoamide resin; polyether sulfone; polymethyl pentene; polyether ether ketone; polyether imide; polyvinyl carbazol; and a norbornene based amorphous polyolefin.

In using a water-soluble binder resin, the capsules are dispersed in a state in which the binder resin is dissolved in water, and cured thereafter.

In case of using a non-aqueous binder resin, the binder resin is dispersed in water to obtain an emulsion, and the capsules are mixed therein and cured.

From the viewpoint of mobility and the reflectance on white display, the shape of the electrophoretic fine particles is preferably not truly spherical, but has some anisotropy. The length along the major axis direction of the fine particles is preferably 1.1 times or more than the length along the minor direction. Otherwise, the difference in the maximum and the minimum cross section area taken in such a manner that it may include the center of the fine particle is set as such that the ratio be 1.1 times or higher. By using fine particles having such an anisotropy, a high mobility and a high reflectance in displaying white color can be obtained.

Figure 4:
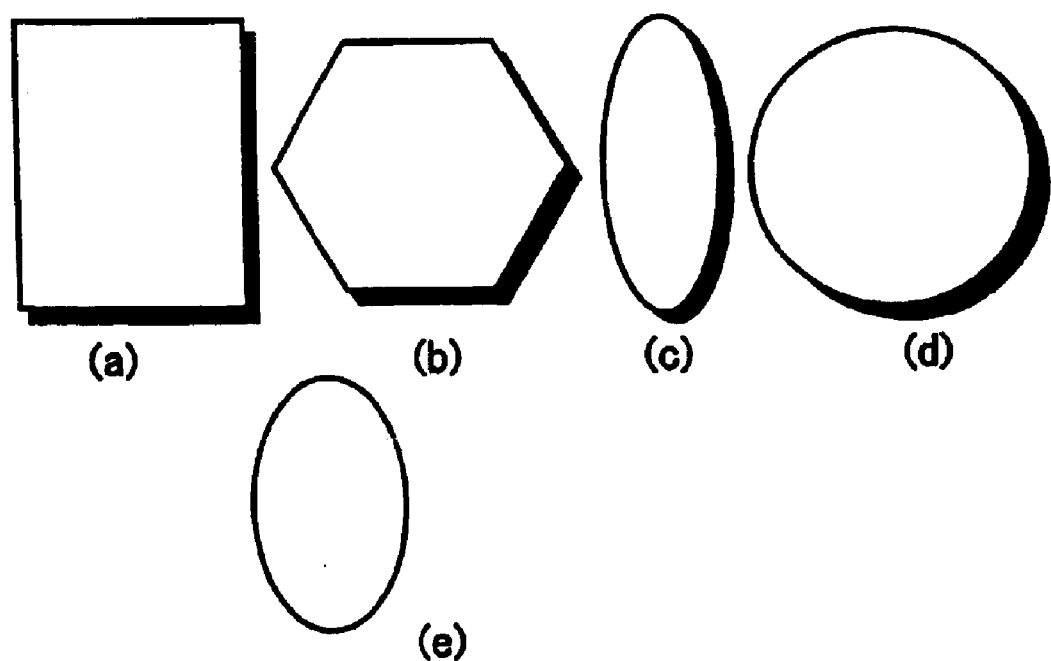
FIGS. 4A to 4E are a diagram showing the examples of anisotropic electrophoretic fine particles differing in shape for use in an electrophoresis display according to the invention.

The shape of such fine particles having anisotropy is shown in FIGS. 4A to 4E. FIGS. 4A and 4B show an example of planar particles, FIG. 4C shows an example of an ellipsoidal platy particle, FIG. 4D shows an example of a disk shaped particle, and FIG. 4E shows an example of a streamline shaped particle.

The fine particles having anisotropy can be formed in the following manner. After preparing spherical fine particles of polymer in an ordinary method, planar fine particles can be obtained by applying pressure thereto while heating. By further rotating the thus prepared particles, streamline shaped fine particles can be obtained. It is possible to obtain anisotropic fine particles by applying an external force such as intense magnetic field during agglomeration.

Figure 5:
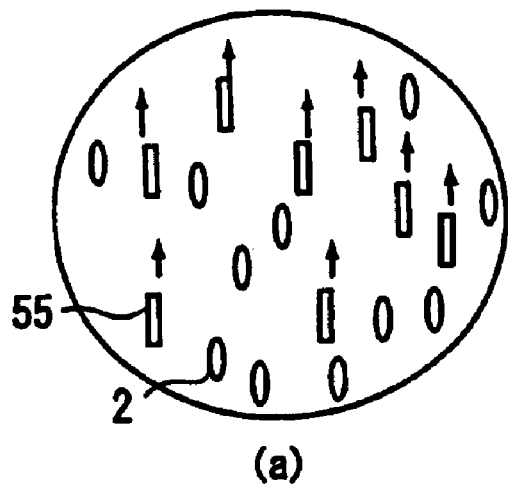
FIGS. 5A to 5D are a diagram showing the behavior of the fine particles for use in a guest-host electrophoresis method using anisotropic electrophoretic fine particles.
Figure 5:
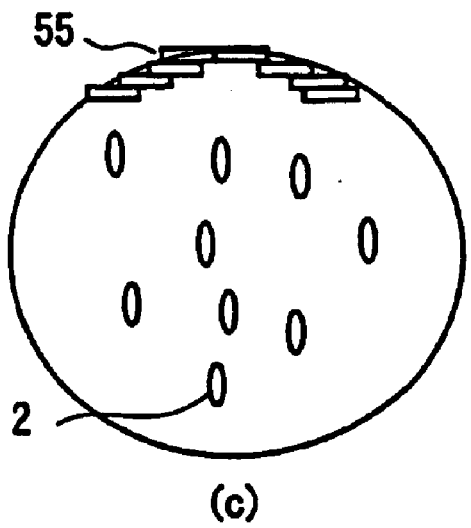
Figure 5:
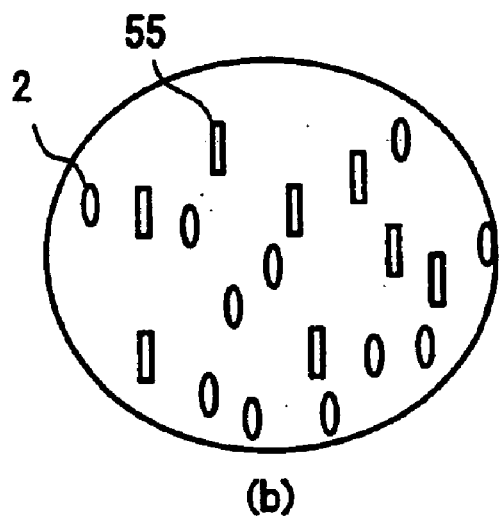
Figure 5:
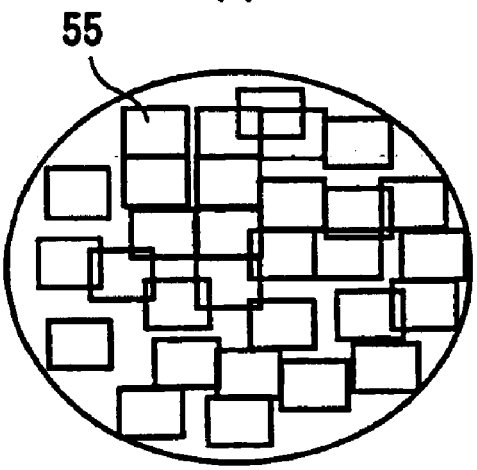

In FIG. 5 is shown a case using white anisotropic fine particles 55.

The white anisotropic fine particles 55 herein are planar fine particles as shown in FIG. 4A.

Voltage is applied in the vertical direction of FIG. 5. The observation is made from the upper side. FIGS. 5A and 5C show the side view of the capsule, and FIGS. 5B and 5D show the planar view, i.e., the view from the direction of observation.

In a state in which the anisotropic fine particles 55 are dispersed in the capsule under no applied voltage, the first coloring matter and the second coloring matter are mixed to realize black display. However, since the anisotropic fine particles 55 are dispersed randomly, they may slightly affect the black display. Accordingly, by accumulating the anisotropic fine particles 55 on the lower side by applying direct voltage in advance, and by then realizing a state of no applied voltage, a superior black color display can be obtained while avoiding the influence of the anisotropic fine particles 55.

Further, on applying alternating voltage at a frequency not lower than a predetermined value, the anisotropic fine particles 55 maintain the dispersed state. The first coloring matter align along the vertical direction so that they become non-perceivable from the upper side. Thus, the color of the second coloring matter is displayed.

On applying a direct voltage along the vertical direction, furthermore, the anisotropic fine particles 55 move inside the liquid crystal as shown in FIGS. 5A and 5b. In this case, most of the anisotropic fine particles 55 move facing the vertical direction in such a manner the resistance of movement may be minimized. Thus, the mobility is increased as to increase the response rate. The drive voltage can be lowered because of the high mobility.

Thereafter, the anisotropic fine particles 55 accumulate on the upper side of the capsule as to display white color as shown in FIGS. 5C and 5D.

Even if the state is then changed to such of no applied voltage, the anisotropic fine particles 55 can easily maintain the state arranged in parallel with the surface of the substrate. Since the resistance in the direction of settlement of the anisotropic fine particles 55 is large, the fine particles remain unsettled as to hold their memory for a long duration of time. Furthermore, since the coagulation of fine particles hardly takes place, a high reflectance can be achieved.

In an ordinary solvent, the effect of anisotropic fine particles 55 is higher for a solvent having higher viscosity. In addition, as compared to the case using an ordinary solvent, the effect becomes more distinct in a case using liquid crystal having anisotropy in viscosity.

Figure 6:
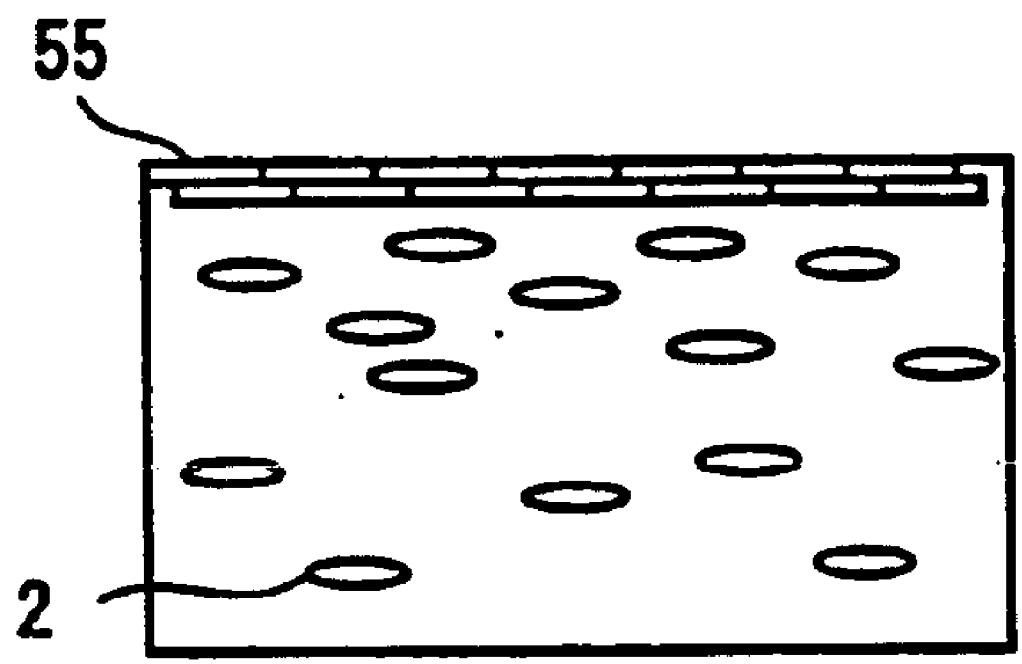
FIG. 6 shows a side view of a columnar microcapsule.

The shape of the microcapsules is generally spherical, but it may be columnar as shown in FIG. 6. The use of such columnar microcapsules is advantageous in that a higher reflectance is obtained, since the fine particles are packed relatively densely on accumulating the anisotropic fine particles 55 by applying direct current voltage.

Concerning the combination of the anisotropic fine particles and the columnar microcapsules, in particular, a response rate as high as several tens of milliseconds can be realized on switching from white to color, or from white to black, such that it may correspond to moving pictures. In this case, the reflection attributed to the fine particles is cut off by the movement of the fine particles changing their direction of alignment, and this results in high response rate.

The present invention is described in detail referring to some examples.

EXAMPLE 1

Capsules according to guest-host electrophoresis method were prepared in the manner described below.

Figure 2:
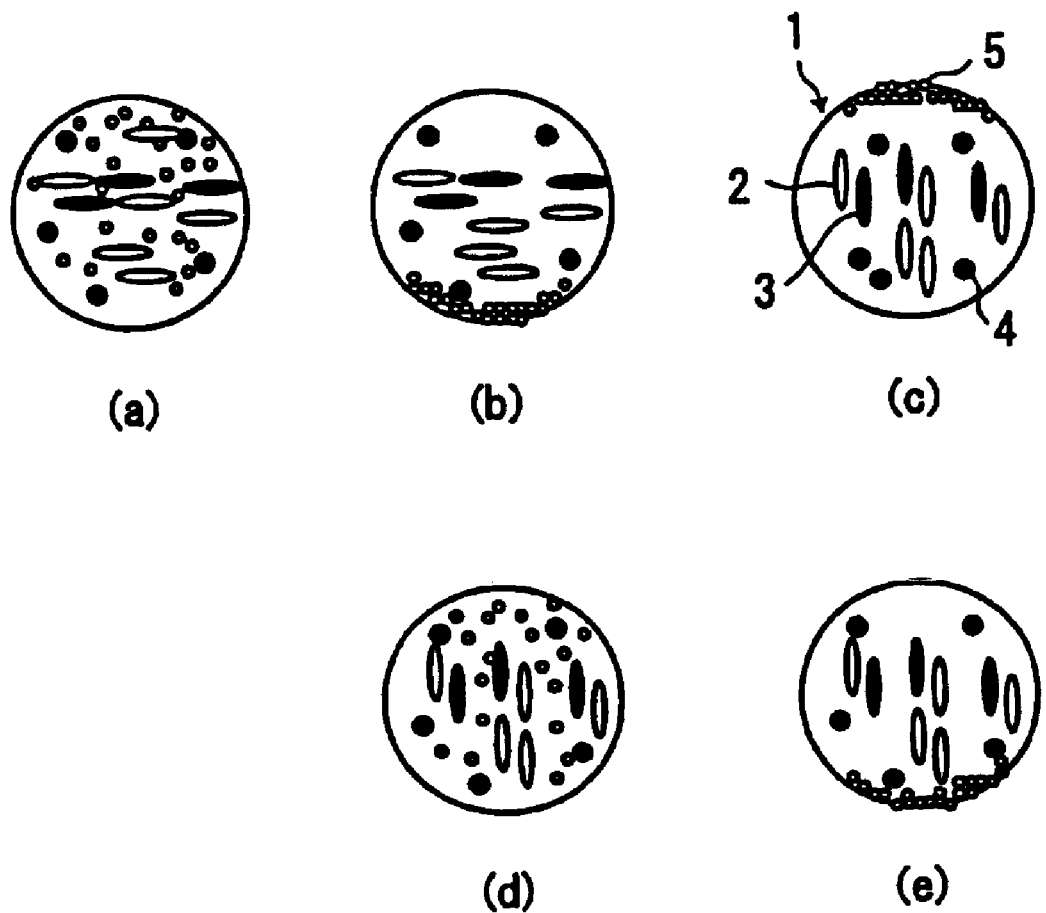
FIG. 2 is an explanatory diagram showing each of the display states using the guest-host electrophoresis method according to an embodiment of the invention.
Figure 17:
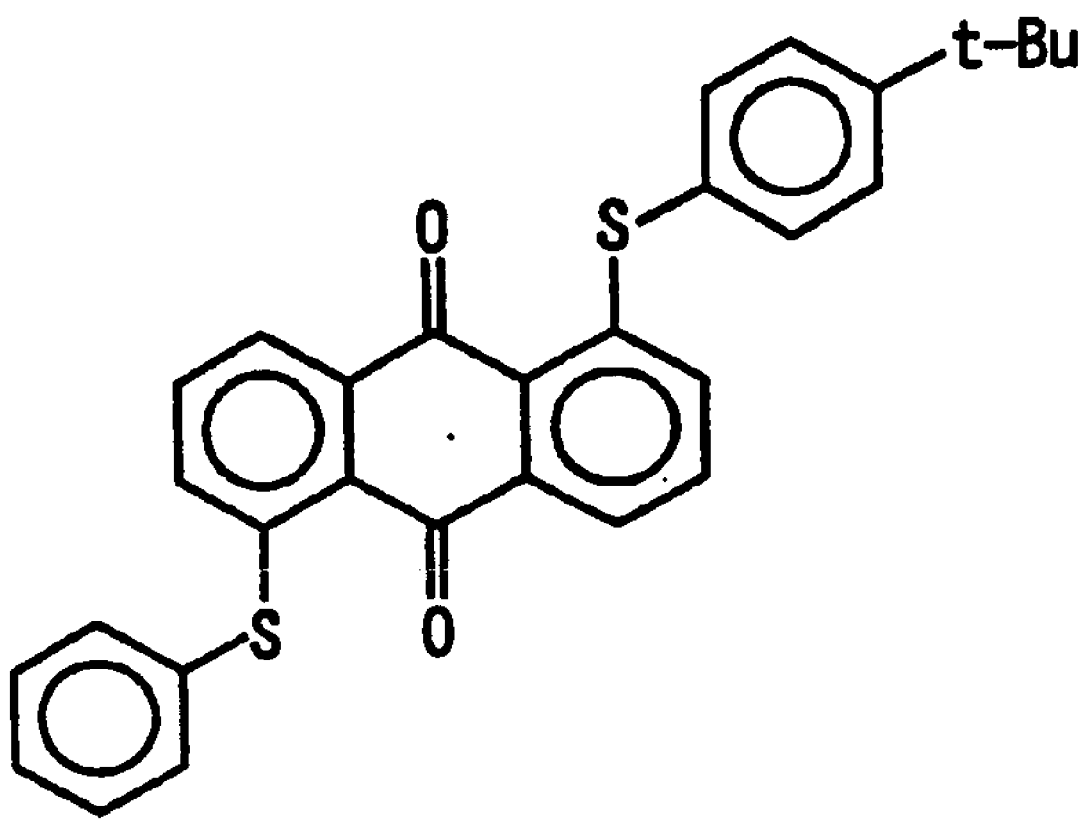
FIG. 17 is an example of a dichroic coloring matter for use in Example 1.

Two parts by weight of a yellow dichroic coloring matter (first coloring matter) having a molecular structure shown in FIG. 17 and 2 parts by weight of a blue anthraquinone dye (C.I. Disperse Blue 91) (second coloring matter) were dissolved in 70 parts by weight of nematic liquid crystal having positive dielectric anisotropy, ZLI-1840 (trademark; produced by Merck Inc.).

Then, 10 parts by weight of a hydrophilic methyl methacrylate monomer, 5 parts by weight of a hydrophobic isobutyl methacrylate, 1 part by weight of ethylene glycol dimethacrylate as a bridging agent, and 1 part by weight of benzoyl peroxide were dissolved in the liquid crystal solution prepared above. Further, 9 parts by weight of fine titania particles 0.1 μm in mean particle diameter were dispersed in the resulting solution. The mixed liquid crystal solution thus prepared was emulsified together with 3 parts by weight of polyvinyl alcohol and 300 parts by weight of pure water in a homogenizer, and was set to polymerization at 85° C.

After carrying out the polymerization for 1 hour, the product was filtered off with a filter having an aperture of 1 μm, and after rinsing for 3 times with pure water, microcapsules 10 μm in mean diameter and encapsulated in a transparent polymer film were obtained. The particle diameter was controlled by adjusting the stirring rate. The microcapsules thus obtained were dispersed in an acrylic resin at a ratio of acrylic resin to microcapsules of 1 to 10 to obtain an ink of microcapsules.

The resulting ink was applied to a glass substrate provided with an ITO electrode by means of screen printing and dried. Then, a counter substrate provided with an ITO electrode was pressure welded to the resulting substrate to obtain a display device.

Direct current voltage of 10 V was applied to the display device for 100 ms to accumulate the fine titania fine particles on the observation plane, and an alternating voltage of 5V was applied thereto at a frequency of 100 Hz. As a result, a white display was obtained at a reflectance of 60%.

Then, after applying reverse direct current voltage of 10 V to the display device for 100 ms, an alternating voltage of 5 V was applied at a frequency of 100 Hz to obtain a blue display.

On changing to a state of no applied voltage, a black display was obtained at a reflectance of 3%.

EXAMPLE 2

Figure 18:
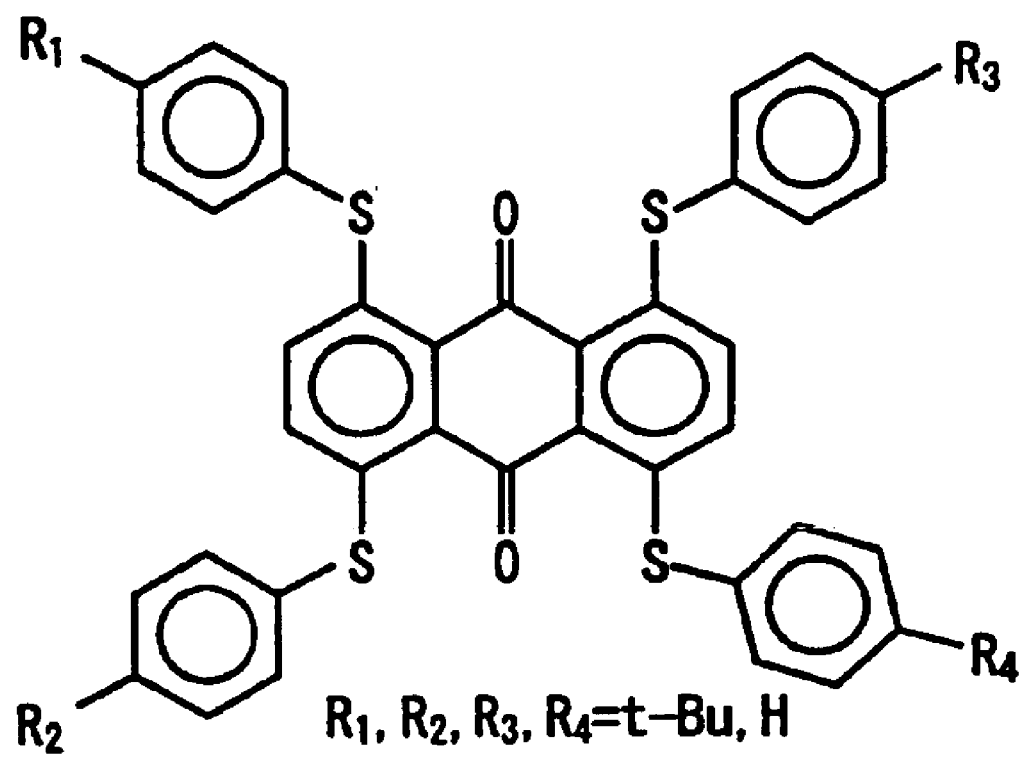
FIG. 18 is an example of a dichroic coloring matter for use in Example 2.
Figure 19:
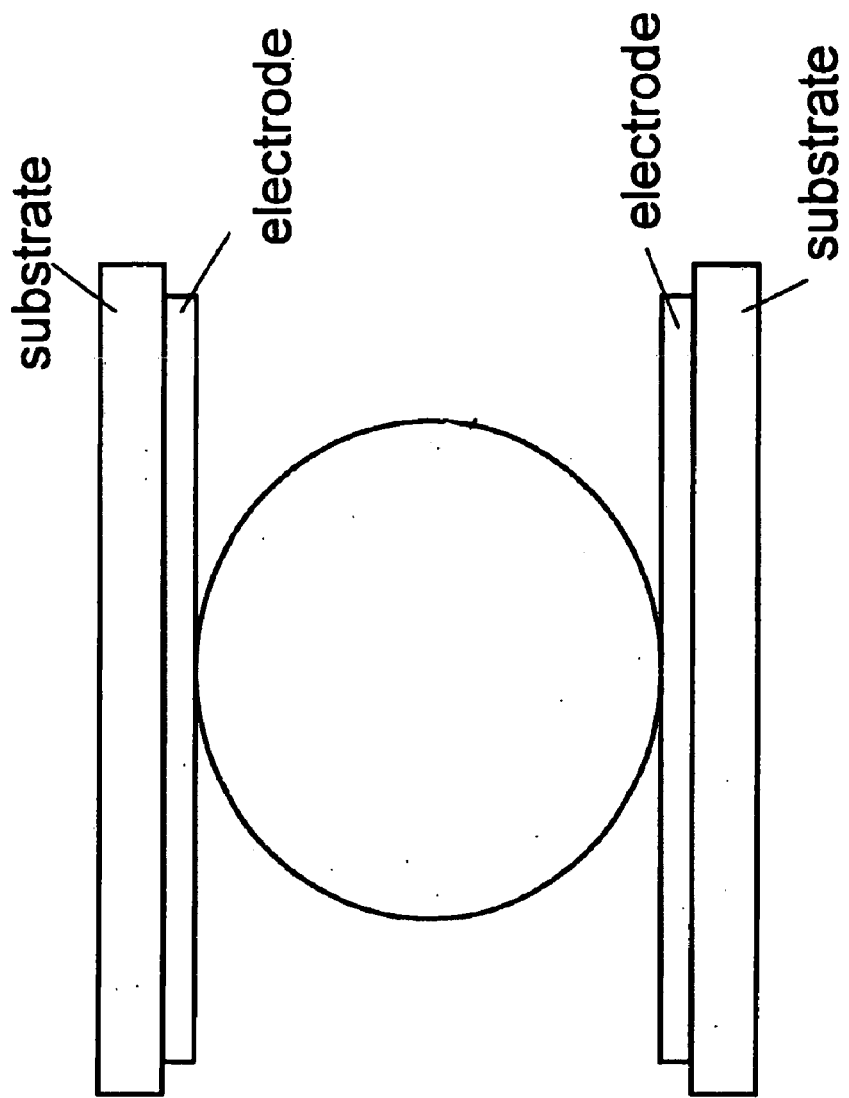
FIG. 19 is a schematic diagram of an electrode in accordance with an exemplary embodiment of the invention.

Microcapsules were prepared in the same manner as in Example 1, except for using a magenta coloring matter having a molecular structure shown in FIG. 18 as the dichroic coloring matter, together with 1 part by weight each of a cyan dye (C.I. Disperse Blue 99) and a yellow dye (C.I. Disperse Yellow 64) as the isotropic coloring matter. The resulting microcapsules were aligned on a substrate to obtain a display device.

Direct current voltage of 10 V was applied to the display device for 100 ms to accumulate the fine titania fine particles on the observation plane, and an alternating voltage of 5V was applied thereto at a frequency of 100 Hz. As a result, a white display was obtained at a reflectance of 60%. Then, after applying reverse direct current voltage of 10 V to the display device, an alternating voltage of 5 V was applied at a frequency of 100 Hz to obtain a green display. On changing to a state of no applied voltage, a black display was obtained at a reflectance of 4%.

EXAMPLE 3

A display device was prepared in the same manner as in Example 1, except for using 2 parts by weight of a dichroic coloring matter LSB318 (trademark, a cyan coloring matter produced by Mitsubishi Chemicals, Inc.) for the dichroic coloring matter, together with 2 parts by weight of a red dye (C.I. Disperse Red 65) as the isotropic coloring matter.

Direct current voltage of 10 V was applied to the cell for 100 ms to accumulate the fine titania particles on the observation plane, and an alternating voltage of 5V was applied thereto at a frequency of 100 Hz. As a result, a white display was obtained at a reflectance of 60%. Then, after applying reverse direct current voltage of 10 V to the display device, an alternating voltage of 5 V was applied at a frequency of 100 Hz to obtain a red display. On changing to a state of no applied voltage, a black display was obtained at a reflectance of 3%.

EXAMPLE 4

The electric field inductive pigments described in Examples 1, 2, and 3 were pattern printed in the Δ alignment as shown in FIG. 3. On driving the device according to a drive method similar to those described in Examples 1, 2, and 3, a white display with a reflectance of 60% and a black display with a reflectance of 3.3% were obtained. On displaying color, gradation was obtained in three stages. More specifically, three colors of (red, black, black), (red, black, white), and (red, white, white) were each obtained in three types of pixels.

COMPARATIVE EXAMPLE 1

The isotropic dyes (second coloring matters) described in Examples 1, 2, and 3 were each dissolved alone in a liquid crystal. Fine titania particles were then dispersed in the resulting liquid crystal. In a manner similar to that described in Example 1, three types of capsules, i.e., red, green, and blue capsules, were prepared. Thus, as shown in FIG. 3, a display device was obtained by arranging the thus obtained capsules in Δ alignment.

On driving the device according to a drive method similar to those described in Examples 1, 2, and 3, a white display was obtained at a reflectance of 60%, but the reflectance on displaying black was found to be 20%; thus, a clear black display was found unfeasible.

COMPARATIVE EXAMPLE 2

The isotropic dyes (second coloring matters) described in Examples 1, 2, and 3 were mixed and dissolved in a liquid crystal. The dispersion medium becomes black colored. Then, a cell was prepared in the same manner as in Comparative Example 1. A color filter having an RGB Δ alignment was tightly adhered to the observer side of the cell.

On driving the device according to a drive method similar to those described in Examples 1, 2, and 3, a favorable black display was obtained at a reflectance 4%, but the reflectance on displaying white was found to be inferior to yield 20%, and the display was found dark. This is attributed to the use of a color filter, which decreases the optical efficiency.

EXAMPLE 5

An RGB Δ alignment was pattern printed in a manner similar to that described in Example 4, except for using fine MMA (methyl methacrylate) particles (with shape shown in FIG. 4A) having their surface vapor deposited with alumina as the charged fine particles.

On driving the device according to a drive method similar to those described in Examples 1, 2, and 3, a favorable white display was obtained at a reflectance as high as 70%, and a black display at a reflectance of 3%. The response rate (from white to color display, and from white to black display) was 60 milliseconds.

In case of a monochromatic image, the image was found to be maintained without any change in contrast even after allowing it to stand for 1000 hours. The response rate in case of Example 4 was 100 milliseconds. The response rate is higher for the present example, and this is attributed to the fact that the display is switched from white by the change in the direction of the charged fine particles accumulated to the upper part.

Furthermore, the memory retention of the monochromatic image for the case in Example 4 is 300 hours at maximum. The reason why a memory retention as long as 1000 hours is obtained in the present case is because the settling rate of the charged fine particles is far smaller for the present case as compared with that of Example 4. More specifically, the planar anisotropic fine particles used in the present case are subject to a larger resistance force against settling when the particles are aligned in parallel direction.

The embodiment of the electrophoresis display according to the invention is used in a constitution as such that the electrophoretic particles are used encapsulated inside a microcapsule together with a dispersion medium containing liquid crystal. By printing the microcapsules above on a predetermined substrate having formed thereon a transparent electrode, an image display device can be implemented. Furthermore, an electronic paper can be prepared by printing the microcapsules on a sheet of paper.

As described in detail above, in accordance with the embodiment of the invention, three types of states, i.e., white, black, and color display states, can be realized in a single pixel. Hence, a color display can be implemented while retaining the high reflectance and high contrast of an electrophoresis method.

The embodiment of the electrophoresis display according to the invention is applicable not only to a large advertising display, but also to a paper-like display.

What is claimed is:

1. An electrophoresis display comprising:

a substrate;

a first electrode formed on said substrate;

capsules provided on said first electrode, said capsules including a first coloring matter having dichroism, a second coloring matter, and charged particles in a liquid crystal dispersion medium; and a second electrode formed on said capsules, wherein said second coloring matter has a smaller dichroism ratio than said first coloring matter.

2. An electrophoresis display according to claim 1, wherein said second coloring matter has an isotropic absorption of light.

3. An electrophoresis display according to claim 1, wherein said first coloring matter has a dichroism ratio of 3 or higher; and wherein said second coloring matter has a dichroism ratio of 1.5 or lower.

4. An electrophoresis display according to claim 1, wherein a color of said first coloring matter is complementary with respect to a color of said second coloring matter.

5. An electrophoresis display according to claim 1, wherein shapes of said charged particles have anisotropy.

6. An electrophoresis display according to claim 5, wherein said charged particles have planer shape.

7. An electrophoresis display according to claim 1, further comprising:

a pigment particle included in said second coloring matter.

8. An electrophoresis display according to claim 1, wherein said pigment particle has a diameter of 0.2 micrometers or smaller.

9. An electrophoresis display according to claim 1, wherein said charged particles are white colored.

10. An electrophoresis display according to claim 1, wherein said charged particles have a diameter of 0.4 micrometers or smaller.

11. An electrophoresis display according to claim 1, wherein said charged particles are titania particles.

12. An electrophoresis display according to claim 1, further comprising:

means for impressing a voltage between said first electrode and said second electrode.

13. An electrophoresis display comprising:

a substrate;

a first electrode formed on said substrate;

a first color capsule provided on said electrode, and including a cyan coloring matter having dichroism and a red coloring matter in a dispersion medium;

a second color capsule provided on said electrode, and including a magenta coloring matter having dichroism and a green coloring matter in a dispersion medium;

a third color capsule provided on said electrode, and including a yellow coloring matter having dichroism and a blue coloring matter in a dispersion medium; and a second electrode formed on said first color capsules, said second color capsules, and said third color capsules, wherein said cyan coloring matter has a larger dichroism ratio than that of said red coloring matter;

wherein said magenta coloring matter has a larger dichroism ratio than that of said green coloring matter; and wherein said yellow coloring matter has a larger dichroism ratio than that of said blue coloring matter.

14. An electrophoresis display comprising:

means for coloring by a capsule, each of said capsule having three expressible colors;

said capsule including a first coloring matter having dichroism, a second coloring matter, and charged particles in a dispersion medium;

impressing means for impressing a voltage to said capsule; and wherein said second coloring-matter has a smaller dichroism ratio than that of said first coloring matter.

15. An electrophoresis display according to claim 14, wherein said capsule is a liquid crystal microcapsule.

16. An electrophoresis display according to claim 14, wherein said impressing means impresses an alternating current and a direct current.

17. An electrophoresis display according to claim 16, wherein said capsule expresses a black when said impressing means impresses no voltage, said capsule expresses a white when said impressing means impresses a first direct current, and said capsule expresses a color other than said black or said white when said impressing means impresses an alternating current or a second direct current being an inverse of said first direct current.

18. A method of making an electrophoresis display comprising:

providing a substrate;

forming a first electrode on said substrate;

providing, on said first electrode, capsules comprising a first coloring matter having dichroism, a second coloring matter, and charged particles in a liquid crystal dispersion medium; and forming a second electrode on said capsules, wherein said second coloring matter has a smaller dichroism ratio than said first coloring matter.

19. A method of making an electrophoresis display according to claim 18,
wherein said second coloring matter has an isotropic absorption of light.

20. A method of making an electrophoresis display according to claim 18,
wherein said first coloring matter has a dichroism ratio of 3 or higher; and
wherein said second coloring matter has a dichroism ratio of 1.5 or lower.

21. A method of making an electrophoresis display according to claim 18,
wherein a color of said first coloring matter is complementary with respect to a color of said second coloring matter.

22. A method of making an electrophoresis display according to claim 18,
wherein shapes of said charged particles have anisotropy.

23. A method of making an electrophoresis display according to claim 22,
wherein said charged particles have planer shape.

24. A method of making an electrophoresis display according to claim 18,
wherein said second coloring matter includes a pigment particle.

25. A method of making an electrophoresis display according to claim 18,
wherein said pigment particle having a diameter of 0.2 micrometers or smaller.

26. A method of making an electrophoresis display according to claim 18,
wherein said charged particles are white colored.

27. A method of making an electrophoresis display according to claim 18,
wherein said charged particles have a diameter of 0.4 micrometers or smaller.

28. A method of making an electrophoresis display according to claim 18,
wherein said charged particles are titania particles.

29. A method of making an electrophoresis display according to claim 18, further comprising:
impressing a voltage between said first electrode and said second electrode.

* * * * *

UNITED STATES PATENT AND TRADEMARK OFFICE
CERTIFICATE OF CORRECTION

PATENT NO. : 6,798,470 B2
DATED : September 28, 2004
INVENTOR(S) : Iwanaga et al.

It is certified that error appears in the above-identified patent and that said Letters Patent is hereby corrected as shown below:

Title page,
Insert the following Items:
-- [45] Date of Patent: *Sep. 28, 2004
  [*] Notice: Subject to any disclaimer, the term of this patent is extended or adjusted under 35 U.S.C. 154(b) by 110 days.

This Patent is subject to a terminal disclaimer --

Signed and Sealed this

Fourth Day of January, 2005

JON W. DUDAS
*Director of the United States Patent and Trademark Office*